United States Patent [19]
Vogel

[11] Patent Number: 4,874,402
[45] Date of Patent: Oct. 17, 1989

[54] PROCESS FOR PURIFYING AND COOLING A HOT GAS

[75] Inventor: Jacobus E. Vogel, The Hague, Netherlands

[73] Assignee: Shell Oil Company, Houston, Tex.

[21] Appl. No.: 220,449

[22] Filed: Jul. 13, 1988

Related U.S. Application Data

[63] Continuation of Ser. No. 30,279, Mar. 24, 1987, abandoned, which is a continuation of Ser. No. 688,281, Jan. 4, 1985, abandoned, which is a continuation of Ser. No. 443,981, Nov. 23, 1982, abandoned.

[51] Int. Cl.$^4$ .............................................. B01D 53/14
[52] U.S. Cl. .......................................... 55/22; 55/68; 55/89; 55/222; 55/229; 55/DIG. 25
[58] Field of Search ................. 55/22, 68, 69, 89, 222, 55/228, DIG. 25, 229, 268

[56] References Cited
U.S. PATENT DOCUMENTS

| | | | |
|---|---|---|---|
| 2,357,354 | 9/1944 | Penny | 55/138 X |
| 2,668,754 | 2/1954 | Lichtenfels | 55/22 |
| 2,953,218 | 9/1960 | Coates | 55/22 |
| 3,203,156 | 8/1965 | McGregor et al. | 55/229 X |
| 3,444,668 | 5/1969 | Masuda | 55/228 X |
| 4,013,455 | 3/1977 | Kleeberg et al. | 55/228 X |
| 4,149,849 | 4/1979 | Vigesdal | 55/89 |
| 4,170,550 | 10/1979 | Kamody | 55/68 X |
| 4,322,221 | 3/1982 | Kamody | 55/68 X |

OTHER PUBLICATIONS

Browning, J. E. "Agglomeration: Growing Larger in Applications and Technology," *Chemical Engineering*, 12-4-67, pp. 149-170.

Primary Examiner—Charles Hart

[57] ABSTRACT

A process for cooling and cleaning a hot fly ash containing synthesis gas wherein the gas is first passed through a cooler, the bulk of the fly ash being separated from the cooled gas in a cyclone, whereupon the gas is further cleaned in a water scrubber. At least a part of the fly ash/water slurry obtained in the scrubber is injected into the crude synthesis gas and the fly ash particles are agglomerated in the hot crude gas and/or in the slurry by adding a binder, e.g., water glass.

18 Claims, 1 Drawing Sheet

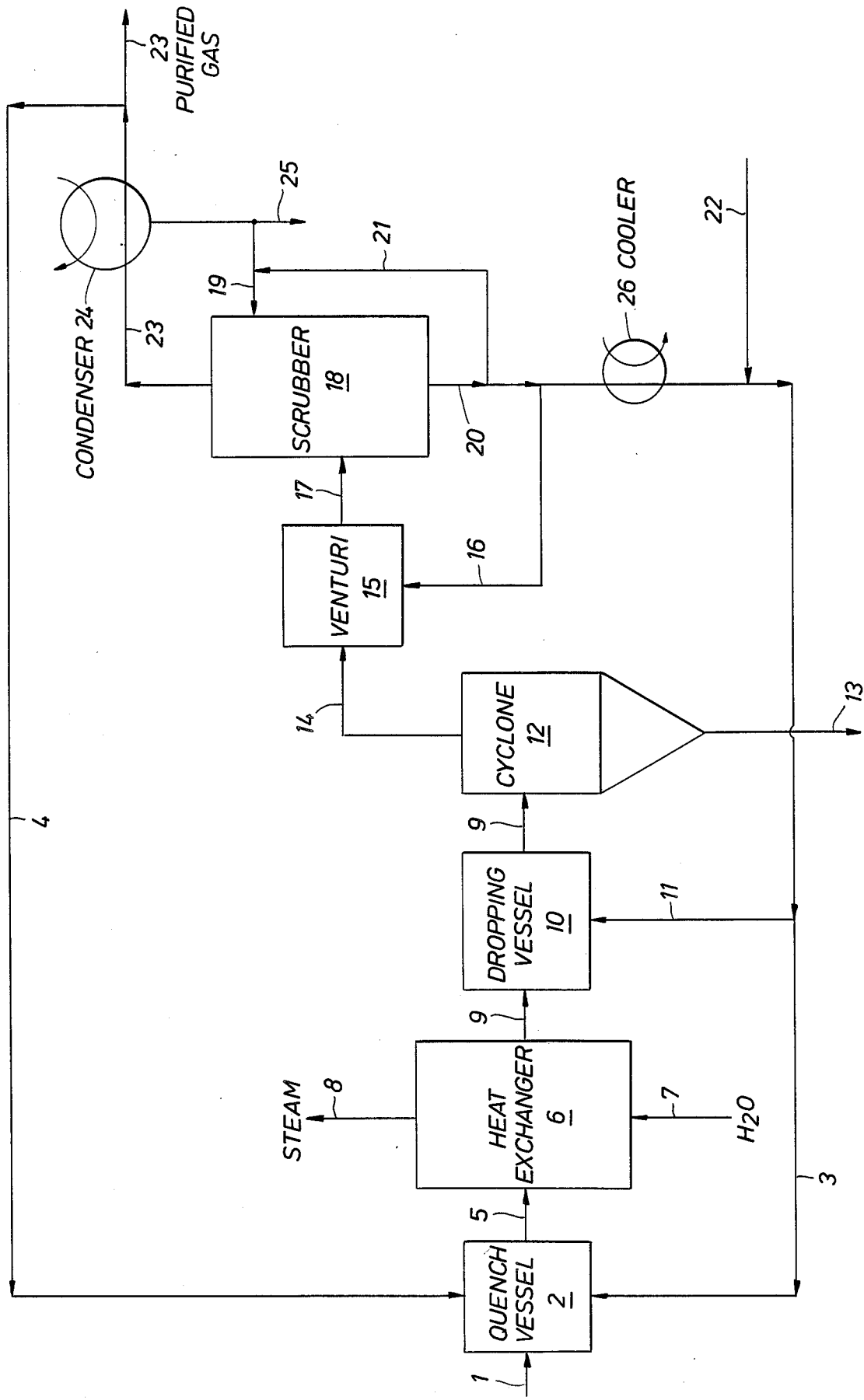

PROCESS FOR PURIFYING AND COOLING A HOT GAS

This is a continuation of application Ser. No. 030,279 filed Mar. 24, 1987, which is a continuation of Ser. No. 688,281, filed Jan. 4, 1985, which is in turn a continuation of Ser. No. 443,981 filed Nov. 23, 1982. All applications are abandoned.

FIELD OF THE INVENTION

The present invention is directed to a process and apparatus for cooling and cleaning hot fly ash containing synthesis gas.

BACKGROUND OF THE INVENTION

A very suitable process and apparatus useful for purifying and cooling the crude product gases from oil and coal gasification processes is described in U.S. Pat. 4,149,859.

If has been found, however, that in the coal gasification the crude product gases contain many fine ash particles, known as fly ash, of which a considerable quantity is so fine that it cannot be separated off by the cyclone or cyclones. Said particles are then removed from the gas in the water scrubber, and by the recycling of the aqueous suspension formed to the hot gas, said fines are returned into the system. The result is that fines increasingly accumulate in the loop formed by the cyclone(s), water scrubber, recycle loop of the suspension and possibly the heat exchanger(s), if no suspension of fine ash particles is discharged from the purification system. The heat exchanger(s) is/are in said loop if the suspension is not injected into the gas after the heat exchanger(s). Injection of the aqueous suspension into the hot gas before the heat exchanger(s) is advantageous, since the suspension then, in fact, evaporates more readily and the gas is slightly precooled. However, said injection of the suspension before, between or into the heat exchanger(s) is then found to have an extra disadvantage, i.e., the heat exchanger(s) foul as a result of local deposition of fines. Said deposition causes a lower degree of heat transfer because the outlet temperature of the gas from the heat exchanger(s) becomes too high, with the result that the cyclone is damaged, and the occasional coming loose of a deposited layer further causes a sudden change in temperature for the heat exchange tubes with all undesirable possible consequences thereof.

Investigations have shown that just the smallest particles are deposited in the heat exchanger(s), especially in dead corners. This is partly explained from local decreases in velocity of the rapidly flowing gas and partly from electrostatic causes. These explanations, however, have not yet resulted in a solution to the problem.

SUMMARY OF THE INVENTION

An object of the invention is to provide a process for cooling and purifying a hot gas, while maintaining the advantages of the above-noted method, such as the solid matter being liberated completely in dry condition and water being not, or practically not, used or discharged, and lacking the drawback of the accumulation of fine particles in the system and the attendant fouling of the heat exchanger(s).

According to the present invention, this improvement is achieved by agglomerating the solid particles in the hot gas and/or in the suspension to bigger particles.

The present invention is particularly directed to a process for cooling and cleaning hot fly-ash containing synthesis gas wherein the gas is first passed through a cooler, the bulk of the fly ash being separated from the cooled gas in a cyclone, whereupon the gas is further cleaned in a water scrubber. A fly ash/water slurry obtained in the scrubber is at least in part injected into the crude synthesis gas. In order to avoid fouling of the cooler, the fly ash particles in the hot crude gas and/or in the slurry are agglomerated, preferably by adding a binder, e.g., water glass.

BRIEF DESCRIPTION OF THE DRAWING

The single FIGURE is a simplified block diagram of an embodiment of the process.

DESCRIPTION OF THE EMBODIMENTS

The present invention provides a process for purifying and cooling a hot gas containing solid particles by:
  (a) passing the gas through at least one heat exchanger,
  (b) passing the product of step (a) through at least one cyclone in which solid matter is separated from the gas,
  (c) finally conducting the gaseous product of step (b) through a water scrubber where an aqueous suspension of solid particles is formed, and
  (d) recycling the suspension formed in step (c) at least in part to step (a) and injecting it into the gas before, after, between or into the heat exchanger(s), characterized in that the solid particles in the hot gas and/or in the suspension are agglomerated to bigger particles.

The present invention ensures in a surprisingly simple manner that substantially the whole quantity of solid matter is ultimately removed from the hot gas by the cyclone. Since the agglomerated particles are heated to a high temperature in the gas stream before they enter the cyclone(s), the particles are slightly calcined so that they become extra strong and are much more difficult to leach if the come into contact with water. Consequently, when this material is stored in the open air, there is hardly any danger that undesirable components are leached. Therefore, the environment cannot be polluted by the storage of said material.

The solid particles can be agglomerated by various means, for example, by mechanical or electrostatic means, but the best results are obtained if the particles are agglomerated by adding an adhesive agent to the hot gas and/or the suspension. This method, in fact, causes the least interference in the gas flow and, moreover, unlike the other methods referred to, does not operate locally but in the whole loop consisting of the cyclone(s), the water scrubber, the recycle loop of the suspension and (optionally) the heat exchanger(s). An extra advantage of adding an adhesive agent is that it further decreases the leachability of the agglomerated particles. In the gas stream and in the suspension stream an ash particle made tacky by the adhesive agent collides with other ash particles and thus agglomerates to a bigger particle. This particle is perhaps not large enough to be separated off in the cyclone(s); in this case, said particle makes one or more additional cycles, steadily agglomerating until it is large enough to be separated off.

The adhesive agent is preferably added to the suspension that is recycled to the injection point of step (a). This means that the adhesive agent is preferably not injected into the gas stream or into the part of the aqueous suspension that is optionally introduced into the gas between the cyclone(s) and the water scrubber. The adhesive agent can be added to the suspension in a simple manner, for example, by means of a metering pump, whereas addition to the gas stream, which is often pressurized, may present practical problems.

The adhesive agent must have such a composition that it is active either in the (hot or cold) gas stream or in the aqueous suspension and preferably in both media. It may carbonize in the hot gas stream, since this does not cause the agglomerate to decompose. A substance that carbonizes and consequently maintains a certain structure can be used. Starch is an example of a suitable adhesive agent. The adhesive agent, however, is preferably a silicate, for example, an alkali silicate, in particular, a water glass.

As is known, water glass consists of water and sodium silicate, $Na_2O.xSiO_2$ ($x=3-5$). The satisfactory effect of said compound could also result from its dispersive properties, owing to which the (fatty) ash particles still containing some unburnt carbon or soot, are wetted more effectively and can form a better suspension. The silicate is stable to a very high temperature, for example above 1000° C., although it of course loses its water at said temperature and may be in the molten, at least softened state.

Use is preferably made of 0.5-5 g of $Na_2Si_4O_9$ per liter of suspension from the water scrubber. The quantity of water glass added. must be sufficient to compensate for the portion separated off together with the solid particles in the cyclone(s). Since no water other than condensed water vapor is discharged, no water glass can leave the system together with the water.

According to another embodiment of the invention the particles are agglomerated by injecting the suspension as drops into the gas in step (d). The injection preferably takes place into the hot gas, that is into the gas stream before the heat exchanger. If was usual to introduce the suspension as the finest possible haze into the gas stream in order to enable the water to evaporate as quickly as possible. To this end use was preferably made of a spray drier, for example, an "evaporating venturi". Too fine hazes are less suitable for the process according to said embodiment of the invention, since every haze particle then contains such a small quantity of solid matter that too small particles remain after evaporation of the water. The suspension drops injected into the gas stream must be so large that they contain sufficient solid matter to form a solid agglomerate particle that is sufficiently large to be separated off by the cyclone, but on the other hand the drops must not be so large that the water cannot evaporate quickly enough, since said drops then stick to the tube walls of the heat exchanger(s), etc. The drops preferably have an average diameter between 100 and 1000 $\mu$, very suitably 300 $\mu$. The suspension injected as drops may or may not contain adhesive agent. The presence of adhesive agent in the suspension of course promotes the agglomeration of the solid particles in the drops.

According to a particular embodiment of the process according to the invention any deposits of fine solid particles on the tube walls of the heat exchanger(s) and the connecting pipes from the heat exchanger(s) to the cyclone(s) can be removed, namely by using the erosive action of hard, larger particles. For example, ground coal gasifier slag could be injected into the gas stream before the heat exchanger(s). The adhesive agent is preferably added to the suspension and then the latter is injected into the gas at a point before the heat exchanger(s).

An analysis of the particle size distribution of the coal gasifier fly ash has shown that about 50% by weight of said particles is too small to be separated off by a cyclone. This again has certain consequences for the degree of agglomeration; for example, for the adhesive agent concentration and/or the drop size of the injected suspension drops, which value can be found by simple experiments.

With the cyclones generally used and under the usual conditions of gas pressure and temperature the process according to the invention is preferably carried out in such a manner that at least 80% by weight of the solid particles present and entering the cyclone, are separated off.

The application also relates to an apparatus for purifying and cooling a solid particles-containing hot gas, consisting of at least one heat exchanger, at least one cyclone, water scrubber and gas lines connecting said three components in said sequence, a gas supply line before the heat exchanger(s) and a gas discharge line after the water scrubber, and a liquid line connecting the water scrubber to point in the gas line before, in, between or after the heat exchanger(s), characterized in that the liquid line and/or the gas supply line contains an adhesive inlet.

The invention will now be further illustrated with reference to the Figure showing a simplified block diagram of an embodiment of the process and the apparatus according to the invention.

A hot gas originating from a reactor (not shown) in which oil or coal is combusted or gasified, is supplied to a quench vessel 2 through line 1. Here an aqueous suspension is supplied through line 3 to the hot crude gas and a cooled purified gas through line 4. The cooled gas is preferably tangentially supplied to protect the walls of the quench vessel 2 and the connecting lines 1 and 5 as well as possible from excessive temperatures. The gas is passed through line 5 to heat exchanger 6 where water stream 7 is converted into steam stream 8.

The already substantially cooled gas is passed to cyclone 12 through line 9 comprising dropped vessel 10 distributing in the gas drops of aqueous suspension supplied through line 11 connected to line 3.

A cyclone 12 removes most of the solid particles from the gas and discharges them as a dry stream 13. The gas is supplied through line 14 to a venturi 15 in which an aqueous suspension introduced through line 16 is evaporated in the gas. The gas/vapor mixture is supplied to scrubber 18 through line 17. Here the gas is liberated from its remaining solid particles by scrubbing it countercurrently to water supplied through line 19. The resulting aqueous suspension of solid particles is discharged through line 20. Part of said suspension is recycled through line 21 to line 19, another part is passed to venturi 15 through line 16, the remainder being conducted to the quench vessel 2 and the dropping vessel 10 through line 3 and cooler 26. Through line 22 and a regulating valve or a metering pump (not shown) a suitable quantity of the water glass is added to the suspension in stream 20, downstream of the branches 16 and 21. The gas purified in scrubber 18 is discharged through line 23. In said line is another condensor 24 in which water present as water vapor is largely removed from the gas and, in part, recycled to the scrubber through line 19, the rest being removed from the system through line 25. Part of the cooled and purified gas in line 23 is branched off through line 4 to be added to the hot crude gas in quench vessel 2.

The invention will now be further illustrated with reference to an Example.

EXAMPLE

In an apparatus as hereinbefore described with reference to the Figure, 494.2 kg/h of crude synthesis gas is treated. Said gas originates from a coal gasifier, has a temperature of 1500° C. and contains 11.5 kg/h of water vapor and 24.7 kg/h of ash particles. In the quench vessel 2 a quantity of 260.3 kg/h of cooled purified gas of 50° C. and 40.6 kg/h of aqueous suspension of 49° C. are added to said gas. The aqueous suspension consists of 36.4 kg/h of water, 2.3 kg/h of water glass and 1.9 kg/h of ash particles. In the quench vessel 2 all the water evaporates, and the partly agglomerated ash particles are incorporated in the gas/water vapor mixture. Said mixture is passed to the heat exchanger 6 and cooled to 360° C. Via the dropping vessel 10, where 27.0 kg/h of aqueous suspension added, the mixture is now passed to the cyclone 12. The mixture is here separated into solid, dry matter and kg/h of gas/water vapor/solid particles mixture containing synthesis gas, water vapor and solid particles. The dry substance is discharged at the bottom of the cyclone, the gas/water vapor/solid particles mixture leaves the cyclone at the top. Said mixture, which has a temperature of 300° C., is subsequently contacted in the venturi 15 with 65.4 kg/h of a suspension containing 59 kg/h of water and 6.4 kg/h of solid particles. The mixture of synthesis gas, water drops, water vapor and solid particles, which is formed in the venturi 15, is conducted to the water scrubber 18. The synthesis gas/water vapor mixture rising therein is scrubbed countercurrently to an aqueous suspension of 106° C. flowing downwards. At the bottom of the scrubber 18 a quantity of aqueous suspension containing solid particles is separated off. Of this quantity 196.1 kg/h is recycled to the top of the scrubber and 65.4 kg/h is recycled to the venturi 15. The remaining quantity is passed to the dropping vessel 10 and the quench vessel 2 after mixing with 2.2 kg/h of water glass from stream 22, consisting of 1.5 kg/h of water and 0.7 kg/h of $Na_2Si_4O_9$. The gas that is now substantially purified leaves the top of the scrubber 18 and is conducted to the condenser 24 where it is cooled to 50° C. In this treatment a quantity of water is formed by condensation and is separated off. A mixture of 259 kg/h of synthesis gas and 1.3 kg/h of water vapor of the product gas is recycled to the quench vessel 2 through the line 4, the remaining synthesis gas and water vapor being discharged via the line 23 to be further purified from sulfur compound and other chemical impurities.

What is claimed is:

1. A process for purifying and cooling hot synthesis gas containing flyash particles comprising
   (a) passing said synthesis gas through at least one heat exchange to cool said synthesis gas;
   (b) passing cooled synthesis gas from step (a) through at least one cyclone, and separating flyash particles from said synthesis gas in at least one cyclone;
   (c) passing synthesis gas, from which flyash particles have been removed in step (b), through a water scrubber, and forming purified synthesis gas and an aqueous suspension of flyash particles; and
   (d) injecting at least a portion of the aqueous suspension formed in step (c) into the synthesis gas before entry of the synthesis gas into said at least one heat exchanger and agglomerating the flyash particles in the hot synthesis gas, the aqueous suspension, or in the hot synthesis gas and the aqueous suspension by addition of and adhesive agent to the hot synthesis gas, the aqueous suspension, or the hot synthesis gas and the aqueous suspension.

2. A process for purifying and cooling hot synthesis gas containing flyash particles comprising
   (a) passing said synthesis gas through a plurality of heat exchangers to cool said synthesis gas;
   (b) passing cooled synthesis gas from step (a) through at least one cyclone, and separating flyash particles from said synthesis gas into said at least one cyclone;
   (c) passing synthesis gas, from which flyash particles have been removed in step (b), through a water scrubber, and forming purified synthesis gas and an aqueous suspension of flyash particles; and
   (d) passing at least a portion of the aqueous suspension formed in step (c) to step (a), and injecting it into the synthesis gas at a location between the heat exchangers, and agglomerating the flyash particles in the hot synthesis gas, the aqueous suspension, or in the hot synthesis gas and the aqueous suspension by addition of an adhesive agent to the hot synthesis gas, the aqueous suspension, or the hot synthesis gas and the aqueous suspension.

3. A process for purifying and cooling hot synthesis gas containing flyash particles comprising
   (a) passing said synthesis gas through at least one heat exchanger to cool said synthesis gas;
   (b) passing cooled synthesis gas from step (a) through at least one cyclone, and separating flyash particles from said synthesis gas in said at least one cyclone;
   (c) passing synthesis gas, from which flyash particles have been removed in step (b), through a water scrubber, and forming purified synthesis gas and an aqueous suspension of flyash particles; and
   (d) injecting at least a portion of the aqueous suspension formed in step (c) into the synthesis gas after said at least one heat exchanger, but before the said at least one cyclone of step (b), and agglomerating the flyash particles in the hot synthesis gas, the aqueous suspension, or in the hot synthesis gas and the aqueous suspension by addition of an adhesive agent to the hot synthesis gas, the aqueous suspension, or the hot synthesis gas and the aqueous suspension.

4. The process of claim 1 wherein the aqueous suspension injected into the synthesis gas is injected in the form of droplets having an average diameter between 100 and 1000 U.

5. The process of claim 2 wherein the aqueous suspension injected into the synthesis gas is injected in the form of droplets having an average diameter between 100 and 1000 U.

6. The process of claim 3 where in the aqueous suspension injected into the synthesis gas is injected in the form of droplets having an average diameter between 100 and 1000 U.

7. The process of claim 1 wherein solid particles in the aqueous suspension are agglomerated before injection of aqueous suspension into the synthesis gas.

8. The process of claim 2 wherein solid particles in the aqueous suspension are agglomerated before injection of aqueous suspension into the synthesis gas.

9. The process of claim 3 wherein solid particles in the aqueous suspension are agglomerated before injection of aqueous suspension into the synthesis gas.

10. The process of claim 7 wherein the aqueous suspension injected into the synthesis gas is injected in the form of droplets having an average diameter between 100 and 1000 U.

11. The process of claim 8 wherein the aqueous suspension injected into the synthesis gas is injected in the form of droplets having an average diameter between 100 and 1000 U.

12. The process of claim 7 wherein the aqueous suspension injected into the synthesis gas is injected in the form of droplets having an average diameter between 100 and 1000 U.

13. The process of claim 4 wherein the adhesive agent used is water glass.

14. The process of claim 5 wherein the adhesive agent used is water glass.

15. The process of claim 6 wherein the adhesive agent used is water glass.

16. The process of claim 4 wherein 0.5–5 g of $Na_2Si_4O_9$ per liter of suspension is used.

17. The process of claim 5 wherein 0.5–5 g of $Na_2Si_4O_9$ per liter of suspension is used.

18. The process of claim 6 wherein 0.5–5 g of $Na_2Si_4O_9$ per liter of suspension is used.

* * * * *